(12) United States Patent
Lavertu et al.

(10) Patent No.: US 11,982,241 B2
(45) Date of Patent: May 14, 2024

(54) METHODS AND SYSTEMS FOR MULTI-FUEL ENGINE

(71) Applicant: Transportation IP Holdings, LLC, Norwalk, CT (US)

(72) Inventors: Thomas Michael Lavertu, Ballston Lake, NY (US); Adam Edgar Klingbeil, Ballston Lake, NY (US); Eric Dillen, Edinboro, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 161 days.

(21) Appl. No.: 17/645,610

(22) Filed: Dec. 22, 2021

(65) Prior Publication Data

US 2023/0193841 A1 Jun. 22, 2023

(51) Int. Cl.
| | | |
|---|---|---|
| *F02D 19/08* | (2006.01) | |
| *F02D 19/06* | (2006.01) | |
| *F02D 31/00* | (2006.01) | |
| *F02D 41/00* | (2006.01) | |
| *B61C 5/00* | (2006.01) | |

(52) U.S. Cl.
CPC ......... *F02D 19/081* (2013.01); *F02D 19/061* (2013.01); *F02D 19/0644* (2013.01); *F02D 19/0655* (2013.01); *F02D 19/0689* (2013.01); *F02D 19/0692* (2013.01); *F02D 31/002* (2013.01); *F02D 41/0025* (2013.01); *F02D 41/0027* (2013.01); *B61C 5/00* (2013.01); *F02D 2200/0406* (2013.01); *F02D 2200/0414* (2013.01)

(58) Field of Classification Search
CPC ............ F02D 19/0644; F02D 19/0647; F02D 19/0655; F02D 19/081; F02D 19/082; F02D 19/084; F02D 2200/0414; F02D 2200/0416; F02D 41/0025; F02D 41/0027; F02M 21/0206; F02M 37/0064; Y02T 10/30; F02B 43/00
See application file for complete search history.

(56) References Cited

U.S. PATENT DOCUMENTS

| | | | | |
|---|---|---|---|---|
| 6,283,100 | B1 * | 9/2001 | Chen ................... | F02B 29/0493 |
| | | | | 60/599 |
| 6,325,050 | B1 * | 12/2001 | Gallagher ............. | F02D 41/401 |
| | | | | 701/19 |
| 8,370,049 | B1 * | 2/2013 | Shimizu .............. | F02D 19/0671 |
| | | | | 123/304 |
| 9,903,284 | B1 * | 2/2018 | Lavertu .................. | F02D 41/38 |
| 11,598,271 | B1 * | 3/2023 | Klingbeil .............. | F02D 19/081 |
| 11,598,276 | B1 * | 3/2023 | Klingbeil ............... | F02M 26/36 |
| 11,619,183 | B1 * | 4/2023 | Lavertu .................. | F02D 23/02 |
| | | | | 701/103 |

(Continued)

FOREIGN PATENT DOCUMENTS

| | | | |
|---|---|---|---|
| JP | 2010053813 | A * | 3/2010 |
| WO | WO-2022221890 | A1 * | 10/2022 |
| WO | WO-2023016742 | A1 * | 2/2023 |

*Primary Examiner* — John M Zaleskas
(74) *Attorney, Agent, or Firm* — McCoy Russell LLP

(57) ABSTRACT

Methods and systems are provided for a multi-fuel engine. In one example, a method includes adjusting a substitution ratio based on an intake manifold temperature. The method further including adjusting the intake manifold temperature to increase the substitution ratio.

20 Claims, 6 Drawing Sheets

(56) References Cited

U.S. PATENT DOCUMENTS

| | | | | |
|---|---|---|---|---|
| 11,635,046 B1* | 4/2023 | Klingbeil | F02D 41/0007 | 261/19 |
| 2011/0259290 A1* | 10/2011 | Michikawauchi | F02D 19/0692 | 123/1 A |
| 2011/0265463 A1* | 11/2011 | Kojima | F02M 21/0278 | 123/297 |
| 2013/0025573 A1* | 1/2013 | Klingbeil | F02D 19/0692 | 123/525 |
| 2013/0311066 A1* | 11/2013 | Guimaraes | F02D 41/3094 | 701/104 |
| 2013/0325295 A1* | 12/2013 | Klingbeil | F02D 41/0025 | 701/104 |
| 2014/0238340 A1* | 8/2014 | Dunn | F02D 19/0642 | 123/299 |
| 2014/0360473 A1* | 12/2014 | Sturman | F02D 41/3041 | 123/48 AA |
| 2014/0373822 A1* | 12/2014 | Rosswurm | F02D 41/0025 | 123/676 |
| 2015/0176509 A1* | 6/2015 | Lavertu | F02D 41/0027 | 123/27 GE |
| 2015/0240738 A1* | 8/2015 | Yerace | F02D 29/02 | 123/27 GE |
| 2016/0069252 A1* | 3/2016 | Lavertu | F02D 19/0647 | 123/435 |
| 2016/0069287 A1* | 3/2016 | Lavertu | F02D 41/005 | 701/103 |
| 2016/0108873 A1* | 4/2016 | Jackson | F02D 19/0694 | 123/445 |
| 2016/0153375 A1* | 6/2016 | Klingbeil | F02D 41/0027 | 123/577 |
| 2016/0169142 A1* | 6/2016 | Klingbeil | F02D 19/0692 | 123/435 |
| 2016/0252027 A1* | 9/2016 | Jackson | F02D 19/0694 | 60/605.2 |
| 2016/0281615 A1* | 9/2016 | Flynn | F02D 41/0025 | |
| 2017/0089278 A1* | 3/2017 | Tulapurkar | F02D 35/027 | |
| 2018/0238225 A1* | 8/2018 | Yerace | F02D 19/061 | |
| 2019/0257253 A1* | 8/2019 | Klingbeil | F02D 19/0642 | |
| 2021/0301714 A1* | 9/2021 | Klingbeil | F02M 37/0064 | |
| 2021/0310430 A1* | 10/2021 | Fisher | F02D 41/22 | |
| 2021/0340922 A1* | 11/2021 | Sakisaka | F02D 19/0628 | |
| 2021/0404371 A1* | 12/2021 | Yerace | F02D 41/1497 | |
| 2021/0404372 A1* | 12/2021 | Klingbeil | F02D 29/02 | |
| 2022/0010743 A1* | 1/2022 | Das | F02D 41/22 | |
| 2022/0025826 A1* | 1/2022 | Gallagher | F02D 25/00 | |
| 2022/0034284 A1* | 2/2022 | Klingbeil | F02D 19/0644 | |
| 2022/0065181 A1* | 3/2022 | Norton | F02D 41/0025 | |
| 2022/0163005 A1* | 5/2022 | Pedder | F02P 5/1527 | |
| 2023/0081493 A1* | 3/2023 | Lavertu | F02B 39/10 | 60/602 |
| 2023/0098292 A1* | 3/2023 | Klingbeil | F02M 26/32 | 60/273 |
| 2023/0151764 A1* | 5/2023 | Klingbeil | F02B 69/04 | 123/576 |
| 2023/0160350 A1* | 5/2023 | Klingbeil | F02D 41/0025 | 701/104 |
| 2023/0175431 A1* | 6/2023 | Klingbeil | F02P 5/1502 | 60/273 |
| 2023/0175446 A1* | 6/2023 | Klingbeil | F02D 41/0047 | 123/299 |
| 2023/0184181 A1* | 6/2023 | Klingbeil | F02D 19/0694 | 123/445 |
| 2023/0187964 A1* | 6/2023 | Cohn | H02J 3/381 | 307/64 |
| 2023/0193810 A1* | 6/2023 | Klingbeil | F02D 35/027 | 123/27 GE |
| 2023/0193840 A1* | 6/2023 | Dillen | F02D 19/0605 | 123/439 |

* cited by examiner

METHODS AND SYSTEMS FOR MULTI-FUEL ENGINE

BACKGROUND

Technical Field

Embodiments of the subject matter disclosed herein relate to a multi-fuel engine, and more specifically, to adjusting operating conditions to promote higher substitution ratios.

Discussion of Art

Internal combustion engines may include compression-ignition and/or spark-ignition engines. The engine may combust multiple types of fuel. The engine may include multiple injectors positioned to inject directly into a combustion chamber and into an intake port of the engine. A substitution ratio of the engine fueling may be adjusted to adjust engine power output, emissions, engine temperature, and so forth. Some fuels, while energy dense, may be prone to generating poor combustion conditions due to a high heat of vaporization, poor mixing, and/or low flame speed. It may therefore be desirable to have methods and systems for fuel combustion which differ from those that are currently available.

BRIEF DESCRIPTION

In one embodiment, a method may include increasing an intake manifold temperature and increasing a substitution ratio comprising ammonia. The substitution ratio may further include one of diesel, hydrogenation-derived renewable diesel (HDRD), biodiesel, syn-gas, alcohol, gasoline, kerosene, ether, and natural gas. The intake manifold temperature may be increased based on current operating parameters and a threshold manifold temperature.

DETAILED DESCRIPTION

Figure 1:
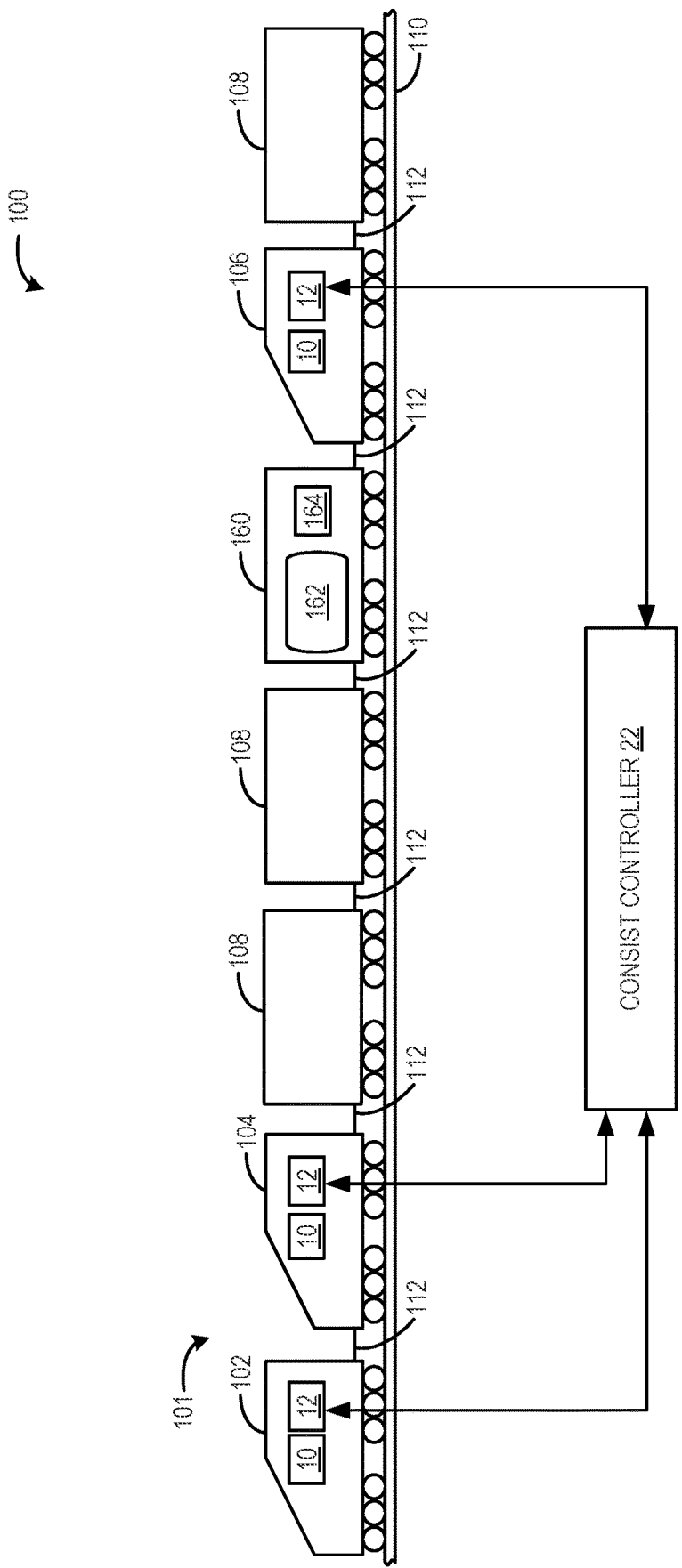
FIG. 1 shows an example embodiment of a train including a locomotive consist.

Embodiments of the invention are disclosed in the following description and may relate to methods and systems for operating an internal combustion engine (ICE). The ICE may operate via a combination of different fuels as a mixture, and in different proportions relative to each other to form a substitution ratio of one fuel relative to another. The substitution ratio is the energy content of the secondary fuel (e.g., a carbon-free fuel or a renewable fuel) divided relative to the total energy content of all fuel provided to a cylinder. These fuels may have relatively different amounts of carbon, and suitable fuels may include one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels and liquid fuels, alone or in combination. The substitution ratio of a primary fuel of the ICE with a secondary fuel may be determined by a controller. The controller may determine the substitution ratio based at least in part on one or more of a current engine load, a current engine temperature, a current manifold temperature, a current injection timing, and a current air/fuel ratio. The controller may determine the substitution ratio based at least in part on the fuels used in the mixture, and their associated characteristics.

In one embodiment, the substitution ratio may correspond to an injection amount of a fuel with a relatively lower carbon content or zero carbon content (e.g., hydrogen gas or ammonia) relative to a carbon-containing fuel. As the substitution ratio increases, the relative proportion of fuel with the lower or zero carbon content increases and the overall amount of carbon content in the combined fuel lowers. In one example, the ICE may combust fuels that include both diesel and hydrogen. During some operating modes, the ICE may combust only diesel, only hydrogen, or a combination thereof (e.g., during first, second, and third conditions, respectively). When hydrogen is provided, operating conditions may be adjusted to account for the hydrogen and to promote enhanced combustion of the hydrogen. When ammonia is provided, operating conditions may be adjusted to account for the ammonia and to promote enhanced combustion of the ammonia.

In one embodiment, the engine system may combust a mixture of three or more fuels—as an example: diesel, hydrogen, and ammonia. Additionally or alternatively, ethanol may be included in the combustion mixture. In one example, a non-fuel mass of a combustion mixture may be adjusted in response to a substitution ratio. The non-fuel mass may be further adjusted in response to an engine temperature, wherein the non-fuel mass may increase in response to increased engine temperatures during multi-fuel combustion. The non-fuel mass may absorb heat, thereby functioning as a heat sink. The non-fuel mass may allow higher substitution ratios at a higher number of engine loads and operating conditions. In one example, the non-fuel mass is defined as a portion of a combustion mixture that reduces a cylinder temperature. Elements included in the non-fuel mass may function as fuels during some combustion conditions. However, the elements may be provided in a manner to the cylinder such that their ignitability is reduced in order to decrease the cylinder temperature.

In one example, systems and methods for the multi-fuel engine may include combusting a primary fuel in combination with one or more secondary fuels. The multi-fuel engine may combust the primary fuel alone. During some conditions, the multi-fuel engine may decrease an amount of primary fuel used via substituting one or more secondary fuels into a combustion mixture. The secondary fuels may include a reduced carbon-content relative to the primary fuel. Additionally or alternatively, the secondary fuels may be less expensive, more available, and/or more efficient. The secondary fuels may vary in ignitibility and burn rate. Certain fuels may result in increased engine temperatures or undesired combustion conditions due to increased or decreased ignitability. To adjust the in-cylinder conditions to replicate single-fuel operation conditions, the non-fuel mass of the cylinders combusting multiple fuels may be adjusted.

Embodiments of the system described herein may include a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles (e.g., automobiles), mining equipment, marine vessels, aircrafts, rail vehicles, and other off-highway vehicles (OHVs). For clarity of illustration, a rail vehicle such as a locomotive is used as an example of a mobile platform. Suitable systems may include an engine, a turbocharger, a fuel system, and a controller or control system. Some embodiments may include an aftertreatment system or other emission reduction system. The vehicles can operate singly or may move as a group. A vehicle group may be coupled together mechanically (as in a consist) and/or virtually (as in a platoon or swarm) to coordinate their movements.

FIG. 1 depicts an example train 100, including a plurality of rail vehicles, a fuel tender 160, and cars 108, that can run on a track 110. The plurality of rail vehicles, the fuel tender, and the cars are coupled to each other through couplers 112. In one example, the plurality of rail vehicles may be locomotives, including a lead locomotive 102 and one or more remote locomotives 104, 106. The locomotives in the train may form a consist. For example, in the embodiment depicted, the locomotives may form a consist 101. As illustrated, the train includes one consist. Throttle and braking commands may be relayed from the lead locomotive to the remote locomotives by a radio link or physical cable, for example.

The locomotives may be powered by an engine 10, while the cars may be un-powered. In the illustrated example, the engine is a multi-fuel engine and may combust gaseous and/or liquid fuels or fuels with differing amounts of carbon, and do so in varying ratios of one fuel to another (i.e., the substitution ratio).

The train may include a control system. The control system may include an engine controller 12, and it also may include a consist controller 22. As depicted in FIG. 1, each locomotive includes one engine controller, all of which are in communication with the consist controller. The consist controller may be located on one vehicle of the train, such as the lead locomotive, or may be remotely located, for example, at a dispatch center. The consist controller can receive information from, and transmit signals to, each of the locomotives of the consist. For example, the consist controller may receive signals from a variety of sensors on the train and adjust train operations accordingly. The consist controller may be coupled to each engine controller for adjusting engine operations of each locomotive. As elaborated with reference to FIGS. 3-6, each engine controller may determine a current engine condition and adjust a substitution ratio thereof. The substitution ratio may be at least partially adjusted in response to an intake manifold temperature. As described above, the substitution ratio corresponds to a substitution of a primary fuel with one or more alternative fuels. The engine may combust the primary fuel alone in one operating mode. However, in other operating modes the engine may perform multi-fuel combustion. The switch of operating modes may be done, for example, to decrease one or more emission types, decrease combustion costs, increase engine efficiency, accommodate a low availability of one or more fuels, and the like. The primary fuel and the alternative fuels may be selected from gasoline, diesel, alcohol(s), ethers, ammonia, hydrogen, natural gas, kerosene, syn-gas, and the like. Suitable diesel fuel may include regular diesel, hydrogenation-derived renewable diesel (HDRD), and biodiesel. In one embodiment, the propulsion system may be augmented with a fuel cell and/or an energy storage device that accepts and/or provides electrical energy to traction motors.

The train may include at least one fuel tender, which may carry one or more fuel storage tanks 162 and includes a controller 164. While the fuel tender may be positioned in front of the remote locomotive 106, in other examples it may be in other locations along the train.

Figure 2:
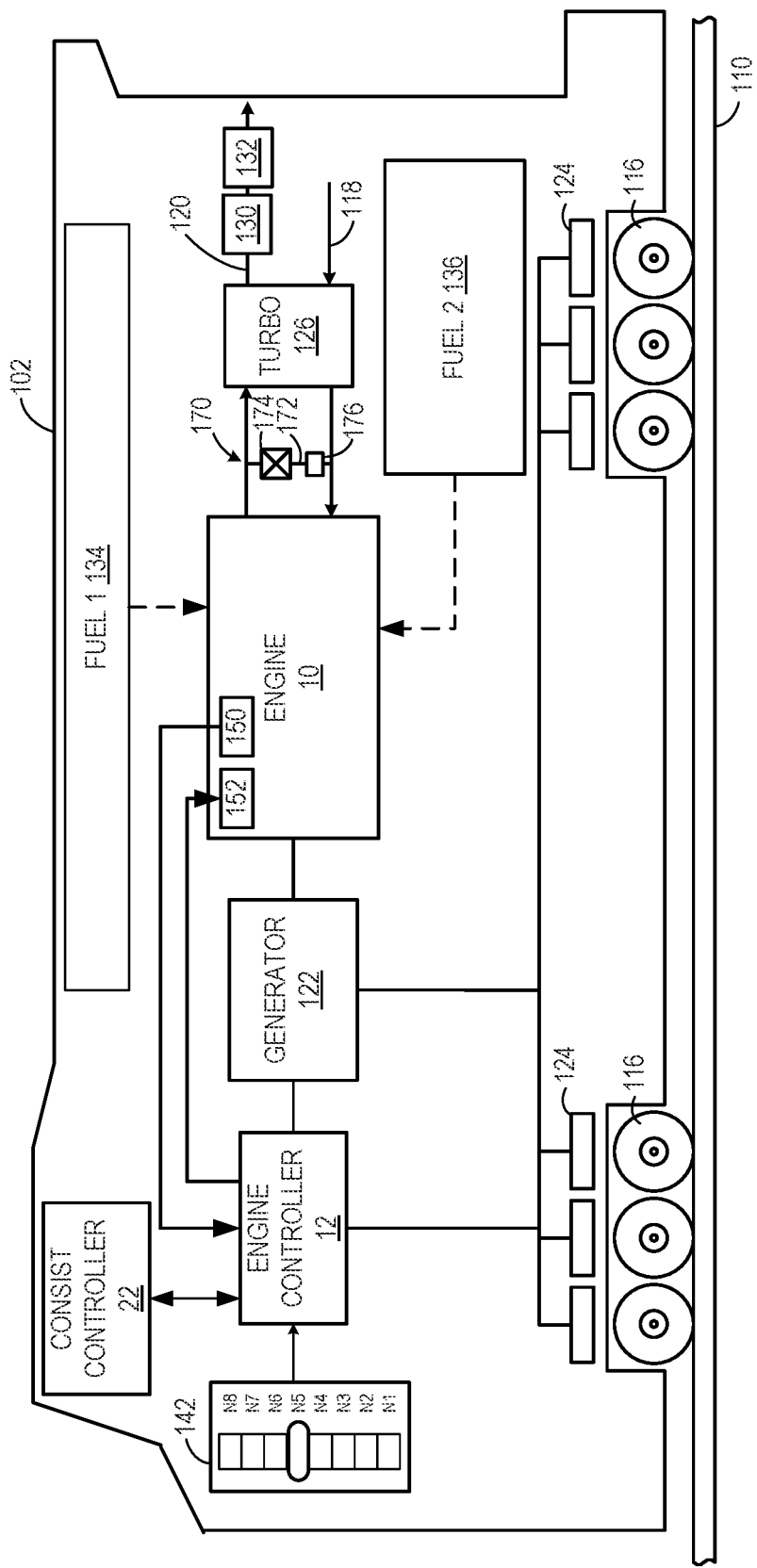
FIG. 2 shows a schematic diagram of an example embodiment of the locomotive from FIG. 1 with a multi fuel engine.
Figure 3:
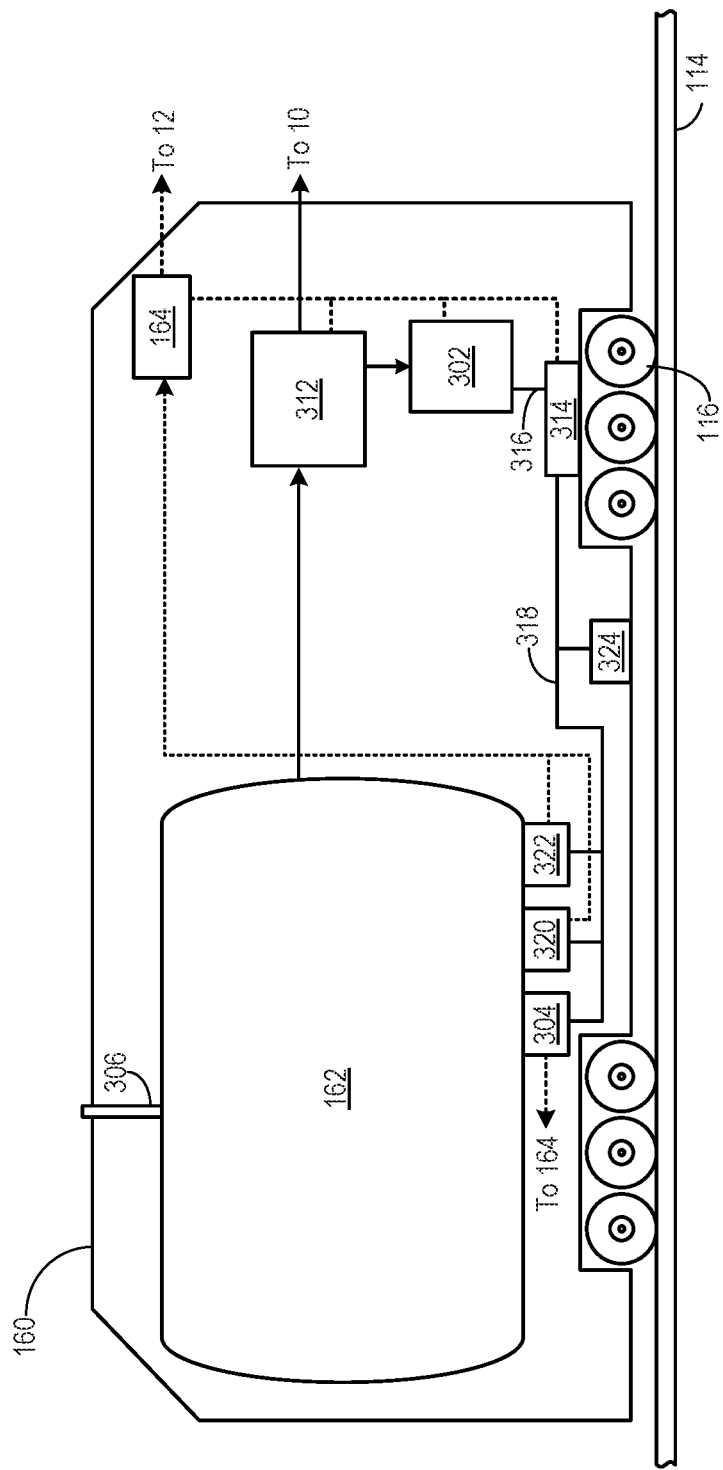
FIG. 3 shows an example embodiment of a fuel tender which may be included in the train of FIG. 1.

In one example, the fuel tender may be non-powered for propulsion, e.g., without an engine or electric traction motors (e.g., electric traction motors 124 shown in FIG. 2). However, in other examples, the fuel tender may be powered for propulsion. For example, as shown in FIG. 3, the fuel tender may include an engine 302). The engine of the fuel tender may combust the fuel stored in the fuel storage tank and/or fuel stored at another vehicle of the train.

The one or more fuel storage tanks of the fuel tender may have a structure suitable for storing a specific type of fuel. In one example, the fuel storage tank may be adapted for cryogenic storage of liquefied natural gas (LNG). As another example, the fuel storage tank may store a fuel in a liquid state at ambient temperature and pressure, such as diesel or ammonia. In yet another example, the fuel storage tank may store a fuel as a compressed gas, such as hydrogen. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, however, fuel may be stored both at the fuel tender and at one or more of the locomotives, e.g., as shown in FIG. 2. In addition, in some instances the fuel tender may have a fuel cell system. The fuel cell system may include a fuel cell and one or more tanks of hydrogen.

FIG. 2 depicts an example embodiment of a rail vehicle of the train from FIG. 1, herein depicted as the locomotive 102, that can run on the track via a plurality of wheels 116. Power for propulsion of the locomotive may be supplied at least in part by the engine. The engine receives intake air for combustion from an intake passage 118. The intake passage receives filtered ambient air from an air filter (not shown). Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine that can combust at least one type of fuel. In another embodiment, the engine operates as a spark ignition engine similarly that can combust at least one type of fuel. For example, the engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual fuel engine, as depicted in FIG. 2, the dual fuel engine that can receive a first fuel from a first fuel reservoir 134 and a second fuel from a second fuel reservoir 136.

While the locomotive is equipped with two fuel reservoirs in FIG. 2, in other examples, the locomotive may include only one fuel reservoir or no fuel reservoir. For example, at least one of the fuel reservoirs may be stored at the fuel tender, e.g., the fuel tender of FIG. 1. Alternatively, a third fuel may be stored at the fuel tender in addition to the first fuel at the first fuel reservoir and the second fuel at the second fuel reservoir of the locomotive. In one example, fuels which may be stored at ambient pressure and temperature without any additional equipment or specialized storage tank configurations may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment.

The first, second, and third fuels (e.g., any fuels stored on-board the train) may each be any of a number of different fuel types. For example, the types of fuel may include carbon-based fuels, such as diesel, natural gas, methanol, ethanol, other alcohols, dimethyl ether (DME), other ethers, biodiesel, HDRD, syn-gas, etc. Alternatively, the fuels may be non-hydrocarbon-based fuels, such as hydrogen, ammonia, water, etc. The fuels listed above are non-limiting examples of fuels which may be combusted at the engine and various other types of fuels are possible.

Additionally, each of the stored fuels may be a gaseous or a liquid phase fuel. Thus, when a compression ignition engine is combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when a spark ignition engine combusts a single fuel type, the engine may consume either a gaseous fuel or a liquid fuel. A multi-fuel spark ignition engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a primary combustion fuel and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel. In some examples, the substitution ratio may be set based on one or more conditions to increase an amount of carbon-free fuel to decrease carbon emissions. A ratio of carbon-free fuels used may be adjusted based on a desired ignition timing, wherein the desired ignition timing is based on one or more of an engine load, an intake manifold temperature and pressure, and an ignitibility of the fuel mixture.

The engine, as the multi-fuel engine, may combust various combinations of the fuels and the fuels may be premixed or not premixed prior to combustion. In one example, the first fuel may be hydrogen and the second fuel may be diesel. In another example, the first fuel may be ammonia and the second fuel may be diesel. In yet another example, the first fuel may be ammonia and the second fuel may be ethanol. Further combinations are possible with storage of the third fuel on the fuel tender. For example, LNG may be stored at the fuel tender and the engine may combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When engine conditions permit combustion of only a single fuel (either spark ignition or compression ignition), the engine may consume a single liquid phase fuel. For example, the engine may combust diesel, gasoline, ammonia, LNG, or another liquid phase fuel. Similarly, the engine may combust a single gaseous fuel, such as hydrogen, or another gaseous fuel.

Furthermore, a fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one example, one or more of the fuels may be delivered to the engine cylinders via an indirect injection method, such as intake-port injection and/or exhaust-port injection. In another example, at least one of the fuels may be introduced to the engine cylinders via direct injection. In yet another example, at least one of the fuels may be injected by central manifold injection. The engine may receive the fuels exclusively by indirect injection, exclusively by direct injection, or by a combination of indirect and direct injection. As one example, the fuels may be injected via port injection during low loads and by direct injection during high loads. In particular, when one of the fuels is a gaseous fuel, premixing the gaseous fuel, with air and/or EGR, may be desirable via port injection. The fuels may also be premixed when introduced by central manifold injection. Premixing by direct injection is also possible, such as by injection of the gaseous fuel during an intake stroke of the engine cylinders. Additionally or alternatively, a location of injection of one or more fuels may be based on an ignitibility of a fuel. For example, ammonia may be injected indirectly and premixed with boost air and/or EGR to enhance an ignitibility and a vaporization thereof.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be injected by port injection or direct injection. Similarly, fuels such as methanol and ethanol may also be either port injected or direct injected. In some instances, the engine may have fuel injectors capable of switching between injection of gaseous fuels and of liquid fuels.

The fuels combusted by the multi-fuel engine, whether in the gas phase or liquid phase, may or may not be premixed prior to combustion according to the type of fuel. For example, depending on operating conditions, premixing of hydrogen, natural gas, ammonia, methanol, ethanol, and DME may be desirable. During other operating conditions, fuels such as diesel, hydrogen, natural gas, methanol, and ethanol may not be premixed. For example, a greater magnitude of premixing hydrogen may be desired at higher loads and a lower magnitude of premixing hydrogen may be desired at lower loads. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other examples, the fuel(s) may be injected into a pre-combustion chamber fluidly coupled to a cylinder head where the fuel(s) may mix with air in the pre-combustion chamber before flowing to the cylinder head.

Alternatively, as described above, the fuels may be delivered to the engine cylinders by directly injecting one or more fuels into the engine cylinders when the cylinders are filled with at least the compressed air and, in some instances, the gas phase fuel. Direct injection may include high pressure direct injection (HPDI) and low pressure direct injection (LPDI). When direct injected, the fuels may not be premixed, in one example. However, in another example, premixing may be enabled by direct injection of one or more of the fuels prior to a compression stroke of the engine cylinders, as described above.

For embodiments of the engine where the first fuel is hydrogen and the second fuel is diesel, premixing of the hydrogen with air via port-injection may provide more stable air/fuel mixtures at low engine speeds and smoother engine startups. However, at higher engine speeds, port injection of the hydrogen may increase a likelihood of engine knock. Direct injection of the hydrogen may mitigate knock. Thus, in some examples, combined application of port injection of hydrogen at low engine speeds and direct injection of hydrogen at high engine speeds to mitigate knock may be desirable. Additionally or alternatively, a fuel with a lower ignitibility, such as ammonia, may be premixed with hydrogen to mitigate knock.

Furthermore, a type of gaseous fuel used may determine whether direct injection of the fuel may include HPDI or LPDI, or both HPDI and LPDI. For example, hydrogen, when stored as a compressed gas, may be injected by HPDI or by LPDI, depending on engine load and available delivery pressure. In particular, HPDI of hydrogen may alleviate knock due to continuous burning of the hydrogen as the hydrogen mixes in the engine cylinders. Furthermore, HPDI may enable greater substitution ratios of hydrogen, e.g., substituting for diesel, for example, thereby decreasing $CO_2$, hydrocarbon, $NO_x$, and particulate matter emissions during engine operation.

As shown in FIG. 2, the engine is coupled to an electric power generation system, which includes an alternator/generator 122 and the electric traction motors. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels to provide tractive power to propel the locomotive. One example locomotive configuration includes one traction motor per wheel. As depicted herein, six pairs of traction motors correspond to each of six pairs of wheels of the locomotive.

The locomotive may include at least one turbocharger 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The locomotive further may include an exhaust gas recirculation (EGR) system 170, which routes exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., $NO_x$). The EGR valve may be an on/off valve controlled by the locomotive controller, or it may control a variable amount of EGR, for example. Optionally, an EGR pump may be employed to control the amount of EGR that is supplied to the engine.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger relative to a direction of exhaust gas flow. Additionally, the EGR system may be a donor cylinder EGR system where one or more cylinders provide exhaust gas only to the EGR passage, and then to the intake. Additionally or alternatively, the donor cylinder EGR system may include routing exhaust gases directly to one or more adjacent cylinders.

The locomotive includes an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF may trap particulates, known as particulate matter (an example of which is soot), produced during combustion, and may be comprised of ceramic, silicon carbide, or any suitable material. In other embodiments, the exhaust gas treatment system may additionally include a selective catalytic reduction (SCR) catalyst, three-way catalyst, $NO_x$ trap, various other emission control devices or combinations thereof. In some embodiments, the exhaust gas treatment system may be positioned upstream of the turbocharger, while in other embodiments, the exhaust gas treatment system may be positioned downstream of the turbocharger.

The locomotive may further include a throttle 142 coupled to the engine to indicate power levels. In this embodiment, the throttle is depicted as a notch throttle. However, any suitable throttle or power control mechanism is within the scope of this disclosure. Each notch of the notch throttle may correspond to a discrete power level. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the locomotive. In one example, a value of the notch setting corresponds to an engine load, wherein a higher value is equal to a higher engine load. In other embodiments, the consist controller may determine a trip plan (e.g., a trip plan may be generated using trip optimization software, such as Trip Optimizer™ system available from Wabtec Corporation and/or a load distribution plan may be generated using consist optimization software such as Consist Manager™ available from Wabtec Corporation) including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, may receive signals from a variety of engine sensors 150, as further elaborated herein, in order to determine operating parameters and operating conditions, and correspondingly adjust various engine actuators 152 to control operation of the locomotive. For example, the engine controller may receive signals from various engine sensors including, but not limited to, engine speed, engine load, turbocharger speed, fuel flow rate, intake manifold air pressure, compressor outlet pressure, compressor pressure ratio, exhaust pressure, ambient pressure, ambient temperature, exhaust temperature, engine temperature, exhaust oxygen levels, etc. Correspondingly, the engine controller may control the locomotive by sending commands to various components such as the electric traction motors, the alternator/generator, cylinder valves, fuel injectors, the notch throttle, etc. Other actuators may be coupled to various locations in the locomotive.

The consist controller may include a communication portion operably coupled to a control signal portion. The communication portion may receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. The control signal portion may generate control signals to trigger various locomotive actuators. Example locomotive actuators may include air brakes, brake air compressor, traction motors, etc. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may push propulsion of the train and the locomotive at the front of the train may pull the train, particularly during uphill navigation. As such, a greater load may be placed on the pushing locomotive at the end of the train.

Turning now to FIG. 3, an embodiment of the fuel tender of FIG. 1 is shown. As described above, the fuel tender includes the fuel storage tank, the controller, and the engine. The fuel tender may further include a first unit 304, which may be a device for controlling a temperature and pressure within the fuel storage tank. For example, when LNG is stored in the fuel storage tank, the first unit may be a cryogenic unit. The fuel storage tank sizes and configurations may be selected with reference to end use parameters, may be removable from the fuel tender, and may receive fuel from an external refueling station via port 306.

The fuel storage tank may supply fuel to a fuel modification unit 312. The fuel modification unit may control or adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives (e.g., the engines 10 of FIGS. 1 and 2).

By supplying fuel from the fuel storage tank to the locomotive engines and the engine of the fuel tender, the fuel may be combusted by the engines distributed across the train. In another non-limiting embodiment, the fuel tender engine may generate electricity that may be delivered to one or more components on-board the fuel tender and/or on-board the locomotives. In one example, as depicted in FIG. 3, the fuel tender engine may generate torque that is transmitted to a power conversion unit 314 via drive shaft 316. The power conversion unit may convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one example the power conversion unit includes an alternator (not shown) that is connected in series to one or more rectifiers (not shown) that convert the alternator's AC electrical output to DC electrical power prior to transmission along the electrical bus. Based on a downstream electrical component receiving power from the electrical bus, one or more inverters may invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage tank, a pressure and temperature of the fuel modification unit, the fuel tender engine temperature, pressure, and load, compressor pressure, heating fluid temperature and pressure, ambient air temperature, and the like. In one example, the fuel tender controller may execute code to auto-stop, auto-start, operate and/or tune the engine and the fuel modification unit in response to one or more control system routines. The computer readable storage media may also execute code to transmit to and receive communications from the engine controllers on-board the locomotives.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other device and mechanisms for controlling fuel delivery and storage conditions, etc.

Figure 4:
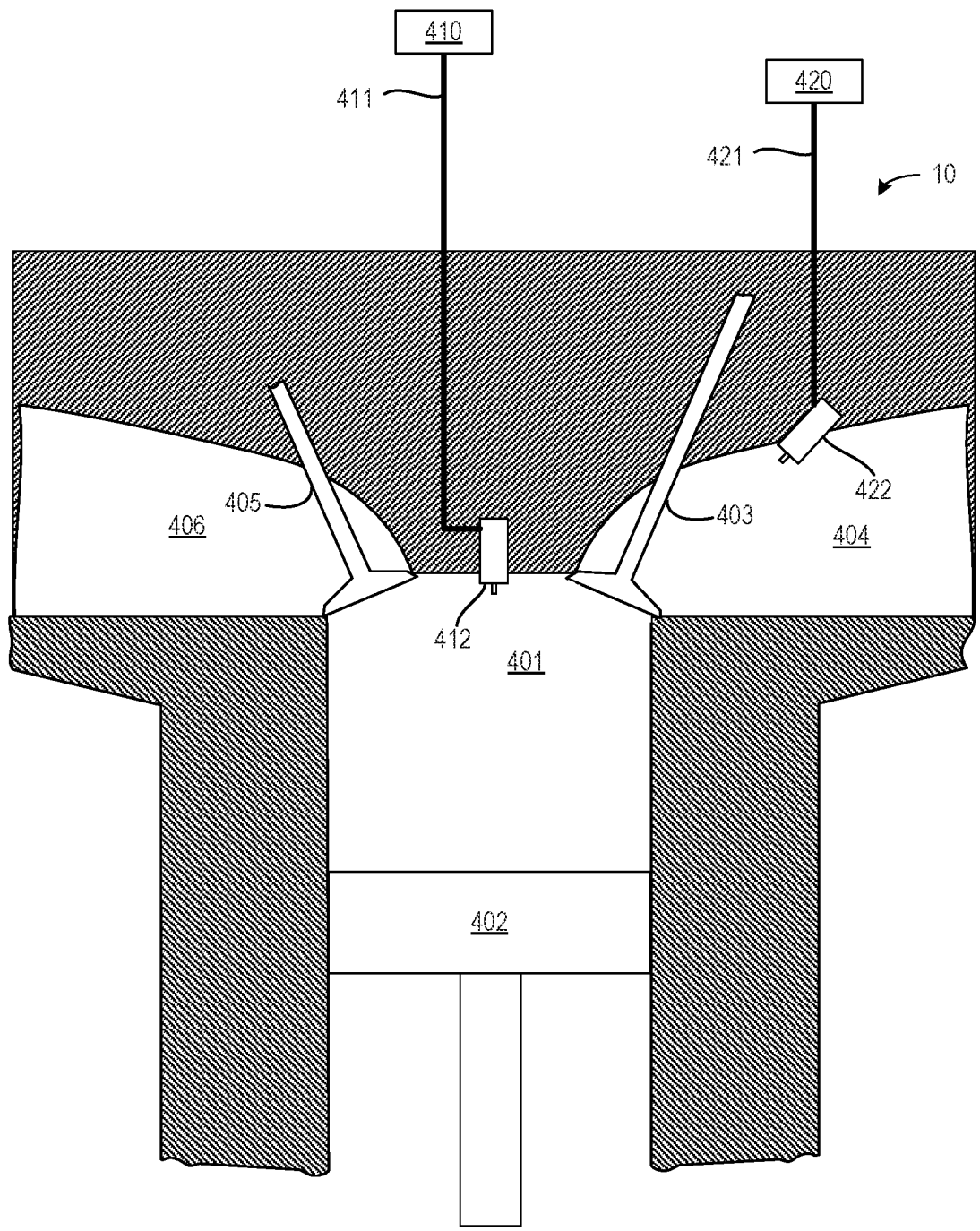
FIG. 4 shows a detailed view of an engine system.
Figure 5:
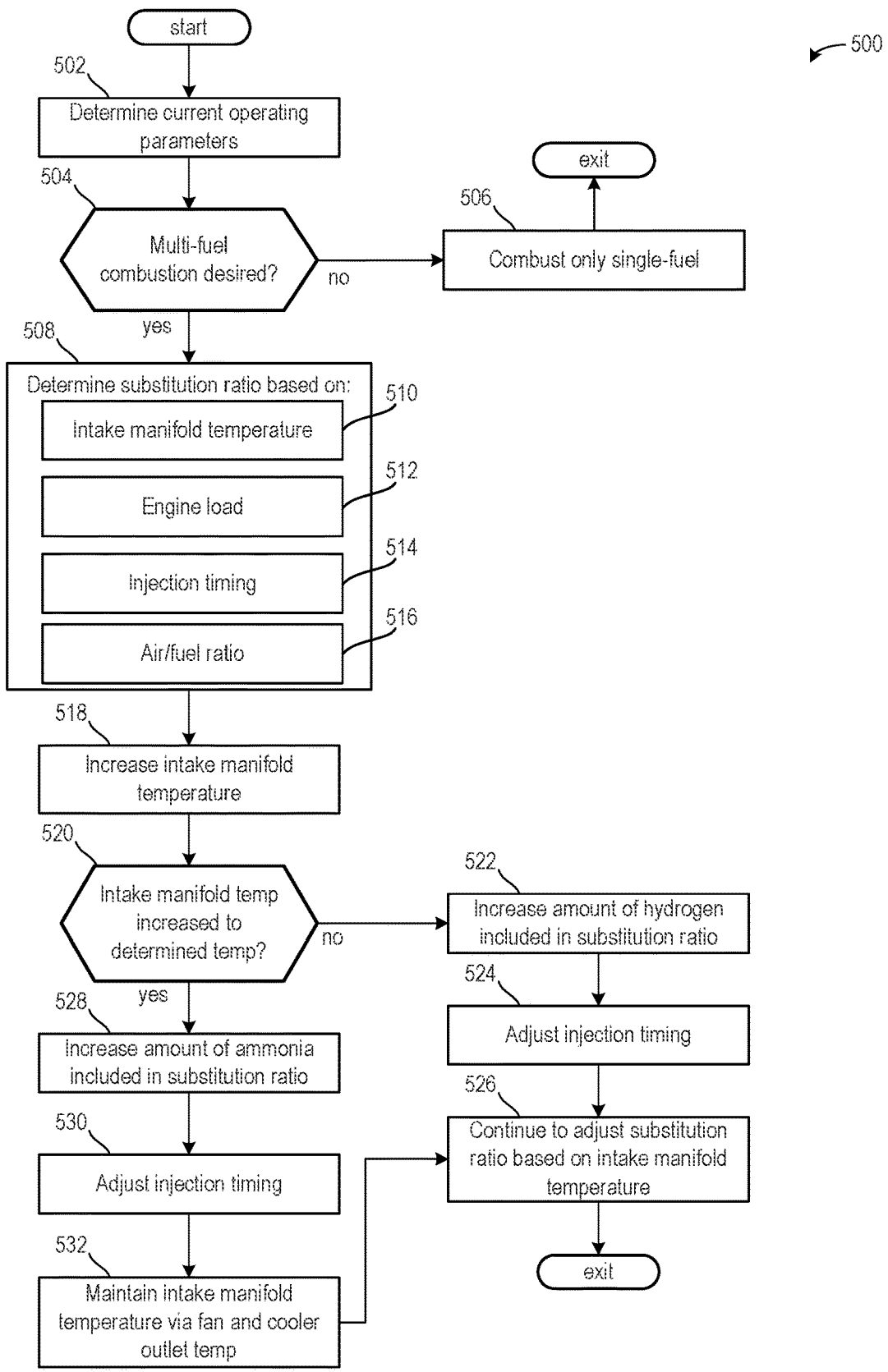
FIG. 5 shows a method for determining an ammonia substitution ratio based on conditions.
Figure 6:
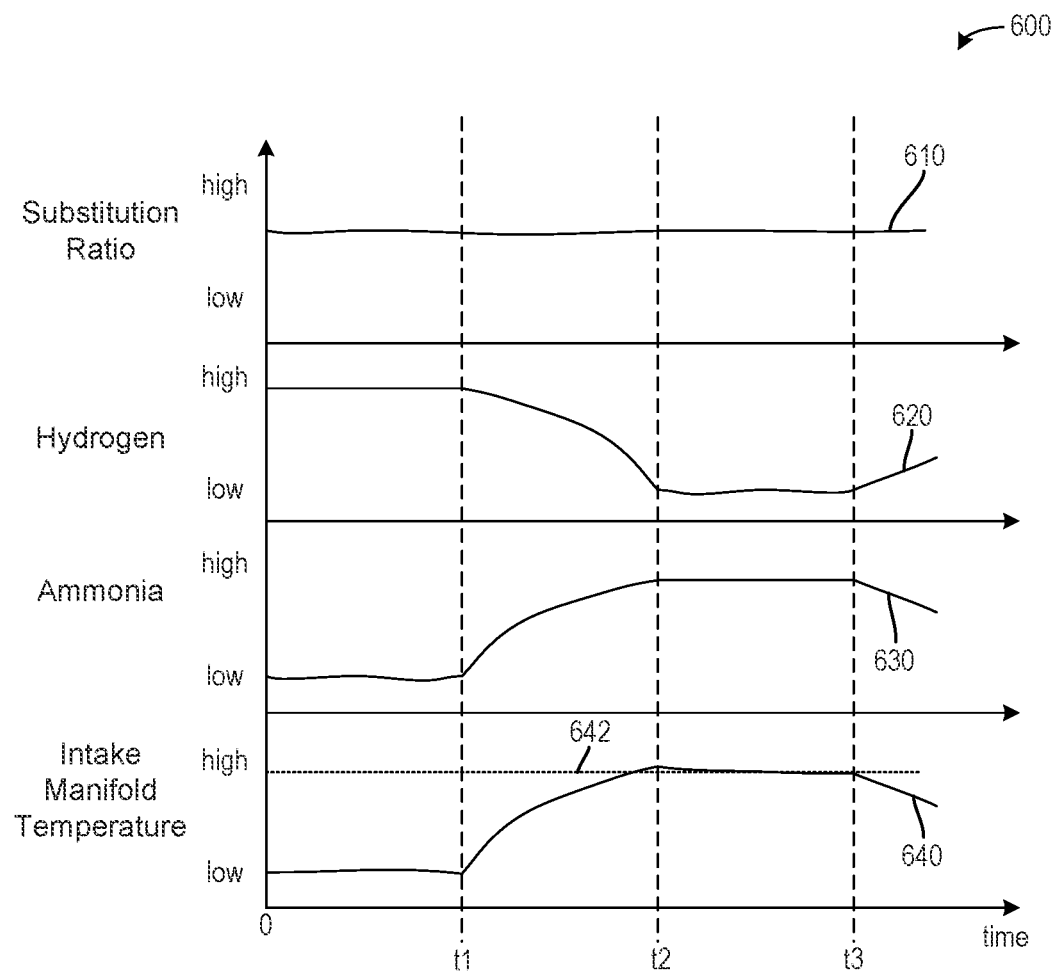
FIG. 6 shows a timeline illustrating adjusting an intake manifold temperature in response to an ammonia substitution ratio.

A more detailed view of a cylinder of the engine and injectors of the fuel system, is shown in FIG. 4. A controller of the vehicle system may use a plurality of different control strategies to an intake manifold temperature to increase a substitution ratio. A method for adjusting the intake manifold temperature is shown in FIG. 5. An engine operating sequence illustrating adjusting the intake manifold temperature is shown in FIG. 6.

Turning now to FIG. 4, it shows an example cylinder 401 of the engine. The cylinder may be one of a plurality of cylinders that each include at least one intake valve 403, at least one exhaust valve 405. Each of the plurality of cylinders may include at least one direct injector 412 and at least one port injector 422. Each fuel injector may include an actuator that may be actuated via a signal from the controller of the engine. The cylinders of the engine may receive fuel from one or more fuel systems based on operating conditions. The fuel systems may include one or more fuel lines fluidly coupling a fuel tank, a pump, and a fuel rail to one or more of the direct injector and the port injector. More specifically, the direct injector may receive fuel from a first fuel system 410 via a first fuel conduit 411. The port-fuel injector may receive fuel from a second fuel system 420 via a second fuel conduit 421. The first fuel system may supply a carbon-containing fuel and the second fuel system may supply a carbon-free fuel, in one example. The carbon-containing fuel may include one or more of gasoline, diesel, biodiesel, natural gas, HDRD, ether, syn-gas, kerosene, and alcohol. The carbon-free fuel may include one or more of ammonia, and hydrogen. In some examples, the engine may be a spark-free engine. In other examples, the engine may be a spark-ignited engine.

In one example, the engine may combust one or more fuel types delivered thereto. For example, the direct injector may inject the first fuel directly to the cylinder and the port-fuel injector may inject a second fuel directly into an intake port 404. In one example, the first fuel is injected as a liquid fuel and the second fuel is injected as a gaseous fuel. The first fuel and second fuel may mix within an interior volume of the cylinder defined by cylinder walls, a cylinder head, and the piston 402. Following combustion, the exhaust valve may expel combustion products from the cylinder to an exhaust port 406.

During operation, each cylinder within the engine may use a four stroke cycle via actuation of the piston along an axis. The cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. A port-injection may occur during the intake stroke. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the gases within the combustion chamber. The point at which the piston is at the end of its stroke and closest to the cylinder head (e.g. when the combustion chamber is at its smallest volume) is typically referred to by those of skill in the art as top dead center (TDC). In a process hereinafter referred to as direct injection, fuel is introduced into the combustion chamber. In some examples, fuel may be injected to the cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

An ignition timing of the engine may be adjusted via either the fuel injection and/or the spark timing. Adjusting one or more of an intake valve timing, a fuel injection timing, a fuel temperature, a fuel pressure, an engine speed, an engine load, an air temperature, an engine temperature, a spark-timing, and boost pressure and/or manifold pressure may allow the fuel injection timing and/or spark timing to be adjusted from a baseline timing. The ignition timing may be based on a position of the piston during the engine cycle and may be desired at or near TDC of a combustion stroke. A more advanced ignition timing may include where the ignition timing is moved prior to TDC of the combustion stroke and a more retarded ignition timing may include where the ignition timing is moved after TDC of the combustion stroke.

Various surfaces of the engine, the cylinders, the intake manifold, and the exhaust manifold may be galvanized with a coating of zinc or may be coated with another suitable material that can tolerate a chemically reactive environment. Such coatings and coating processes include but are not limited to epoxy coatings, chemical vapor deposition coatings and anodized coatings. The surfaces may be galvanized due to exhaust gas constituents dissolving into water contained therein. For example, $CO_2$ compounds may dissolve into water along with $NO_x$ constituents. The $CO_2$ and $NO_x$, constituents may protonate into acidic compounds, which along with the $CO_2$ may decrease a pH of the exhaust gas, thereby increasing an acidity of the exhaust gas. At certain EGR flow rates, the exhaust gas may be corrosive. The water content of the exhaust gas may be increased during operating conditions where hydrogen is being combusted. By galvanizing the engine, the corrosiveness of the exhaust gas may be tolerated.

A first fuel system may provide a first fuel via direct injectors to cylinders of the engine. A second fuel system may provide a second fuel via intake port injectors. A controller with instructions stored thereon may command adjustment of amounts of the second fuel injected by one or more of the injectors of the second fuel system based on one or more operating conditions described with respect to the methods below.

The engine system may have an EGR system for supplying exhaust gas into the cylinder. EGR is a system that selectively directs an amount of exhaust gas expelled from a cylinder and returned to the engine and into the cylinder for re-combustion. EGR may be provided via a dedicated donor cylinder, an adjusted exhaust valve timing, and/or the EGR passage. The donor cylinder may expel exhaust gases from its interior volume and flow the exhaust gases to another cylinder fluidly coupled thereto. Additionally or alternatively, the donor cylinder may expel exhaust gases directly to the EGR passage. The adjusted exhaust valve timing may include where an exhaust valve opening may overlap with an intake valve opening, resulting in a vacuum of the cylinder drawing expelled exhaust gases back into the cylinder. In this way, the EGR rate may be set via the donor cylinder(s), the adjusted exhaust valve timing, and/or valve position in the EGR passage.

In another example of the present disclosure, an exhaust valve timing of the cylinders may be adjusted. In one example, the exhaust valve timing may be adjusted for a given cylinder such that a closing time of an exhaust valve during an exhaust stroke is advanced. Exhaust gases in the cylinder may be retained based on the advanced valve timing which includes the exhaust valve closing prior to completion of the exhaust stroke. By doing this, an EGR rate may be increased.

In some examples, additionally or alternatively, the exhaust valve timing may be delayed such that the exhaust valve may be open with an intake valve of the cylinder during an intake stroke. By delaying the timing of exhaust valve closure, exhaust gases may be re-ingested into the cylinder. In one example, as the exhaust valve closure is more delayed, an amount of exhaust gas re-ingested into the cylinder increases, thereby increasing the EGR rate. Re-ingesting EGR may be desired during conditions where an EGR cooler condensate amount is relatively high and/or when an intake manifold temperature is relatively high.

Turning now to FIG. 5, a high-level flowchart shows a method 500 for determining a maximum substitution ratio based on conditions is shown. The method may be executed by a controller of a vehicle, such as the controller of FIGS. 1-4, based on instructions stored in a memory of the controller.

The method may begin at step 502, which includes estimating and/or measuring vehicle operating parameters and/or conditions. Vehicle operating parameters and/or conditions may be estimated based on one or more outputs of various sensors of the vehicle (e.g., such as one or more exhaust temperature sensors, an engine speed, a wheel speed, and/or a turbo shaft speed sensor, a torque sensor, a manifold pressure sensor, etc., as described above in reference to the vehicle system of FIGS. 1-4). Vehicle operating conditions may include engine speed and engine load, vehicle velocity, transmission oil temperature, exhaust gas flow rate, mass air flow rate, coolant temperature, coolant flow rate, engine oil pressures (e.g., oil gallery pressures), cylinder temperatures, operating modes of one or more intake valves and/or one or more exhaust valves, electric motor velocity, battery charge, engine torque output, vehicle wheel torque, and the like.

At step 504, the method 500 may include determining if multi-fuel combustion is desired. Multi-fuel combustion may be desired based on a multitude of conditions including but not limited to one or more of an emission target, a fuel cost, a combustion mixture efficiency, and a fuel availability. The emission target may be based on an individual vehicle emission target based on a government standard. Additionally or alternatively, the emission target may be based on a local government standard for a geofenced location. For example, a city may include a different emission target than a rural location. A combustion mixture may be customized for a plurality of vehicles operating in the city such that total emissions from the plurality of vehicles may meet local emission targets. By doing this, emission targets of individual vehicles may be exceeded at certain operating points to balance emissions of the plurality of vehicles to meet local emission targets.

In some examples, multi-fuel combustion may be desired based on fuel cost. The fuel cost may be determined via feedback from one or more of a plurality of vehicles, refueling stations, vehicle operators, and so on. An average fuel cost may be determined for each type of fuel included in the consist. For example, if the consist includes diesel, hydrogen, ammonia, methanol, propanol, butanol, and ethanol, costs for each of the fuel types may be determined and a combustion mixture may be adjusted based on at least the costs of the fuel types. In one example, it may be desired to minimize the cost of the combustion mixture.

In further examples, additionally or alternatively, the combustion mixture efficiency may dictate a combustion mixture. The combustion mixture may be adjusted to maximize the combustion mixture efficiency in one example. In other example, the combustion mixture may be adjusted to maximize an engine power output. A vehicle operator may select to prioritize engine power output or the combustion mixture efficiency.

In still further examples, additionally or alternatively, the combustion mixture may be adjusted in response to the fuel availability. In certain locations, one or more of the fuels included in the consist may include a low availability. Consumption of a fuel with low availability may be reduced in some examples. Consumption of a fuel with higher availability may be increased. Fuel availability may be determined based on feedback from a plurality of vehicles and refueling stations. The availability may be determined based on a range from a current location of the vehicle. The range may be equal to a miles remaining based on current fuel levels.

Multi-fuel combustion may include combustion of at least a first fuel and a second fuel. In one example, the first fuel may be a carbon-containing fuel and the second fuel may be a carbon-free fuel including less carbon than the carbon-containing fuel. Multi-fuel combustion may decrease $CO_2$ and/or $NO_x$ emissions of the vehicle by increasing an amount of the second fuel and decreasing an amount of the first fuel. In one example, the multi-fuel combustion may include diesel as the first fuel and hydrogen as the second fuel. Conditions that may impact a substitution ratio may include engine airflow, engine load, intake manifold temperature, ambient pressure and ambient temperature, engine temperature, and exhaust manifold pressure. The substitution ratio may be defined as a percentage of total fuel energy provided by the second fuel. For example, if the desired substitution ratio is 60%, then the second fuel may provide 60% of the fuel energy and the first fuel may provide 40% of the fuel energy. In one example, an amount of carbon-free fuel increases as the substitution ratio increases.

Additionally or alternatively, in some examples, the desired substitution ratio may be adjusted in response carbon emissions (e.g., $CO_2$, hydrocarbons, and other carbon containing combustion byproducts) and/or $NO_x$ emissions. For example, as carbon emissions increase, then it may be desired to increase the substitution ratio. Alternatively, as combustion efficiency decreases, it may be desired to decrease the substitution ratio. Additionally or alternatively, a vehicle controller may select whether multi-fuel combustion is desired based on fuel availability. For example, certain locations may not include fuel stations including alternative fuels such as HDRD, ammonia, hydrogen, and the like. The vehicle controller may request combustion of a single fuel, e.g., if other sources of fuel are not available at local fuel stations. The vehicle controller may be onboard or offboard the vehicle, depending on the selected configuration. In one embodiment, the vehicle controller is an operator that is located onboard the vehicle during operation. As another example, multi-fuel combustion may be desired based on fuel costs. Average fuel costs may be determined via a processor of a central server receiving feedback from controllers of a plurality of controllers of different vehicle systems. The average fuel costs may be determined for each fuel type within various geofenced areas, wherein geofenced areas may include streets, cities, schools, zip codes, states, radii from a current vehicle location, and landmarks.

If multi-fuel combustion is not desired, then at step 506, the method may include combusting only a single fuel. In one example, the single fuel may be a carbon-containing fuel or a non-renewable fuel. In one example, the single fuel is diesel. In some examples, additionally or alternatively, the single fuel may be a renewable fuel, such as HDRD and/or biodiesel.

If multi-fuel combustion is desired, then at step 508, the method may include determining a substitution ratio based on one or more current operating conditions. It may be desired during certain operating parameters to increase the substitution ratio to a threshold substitution ratio. In one example, the threshold substitution ratio is a balance of fuel costs, availability, emissions, and efficiency. The threshold substitution ratio may further promote increased consumption of environmentally friendly fuels, such as renewable carbon fuels, lower carbon content fuels, and carbon free fuels. In one example, the threshold substitution ratio is equal to a highest allowed substitution ratio based on the current operating conditions. Thus, the highest allowed substitution ratio may reduce consumption of diesel, gasoline, or other high-carbon content fuel that is not renewable, while increasing consumption of renewable carbon fuels, lower carbon content fuels, and carbon free fuels.

Renewable, low carbon, or carbon-neutral fuels refers to fuels that can be generated without net production of carbon-based emissions or with a lower net production of greenhouse gases (GHG)/carbon emissions. For example, hydrogen can be produced from electrolysis using solar-generated power free of carbon in the production/use cycle or biodiesel may be produced from plant-based oils. The plants absorb $CO_2$ from the atmosphere which may offset $CO_2$ emitted during combustion or result in a net $CO_2$ used being less than fossil fuels or other hydrocarbon based fuels. However, as described here, the multi-fuel engine may combust with a plurality of fuels regardless of the source of fuel. For example, depending of fuel availability, hydrogen produced through a more carbon intensive process (e.g., grey hydrogen) or ammonia produced from methane may be used.

In some examples, additionally or alternatively, the substitution ratio may include other carbon-containing and carbon-free fuels. Diesel and ammonia may be the primary energy sources (e.g., the fuels providing more energy during combustion relative to other energy sources), wherein other carbon-containing and/or carbon-free fuels may be included in the substitution ratio. For example, one or more of HDRD, biodiesel, hydrogen, methanol and ethanol may be added to the substitution ratio.

The substitution ratio may be based on one or more of an intake manifold temperature at step 510, an engine load at step 512, an injection timing at step 514, and an air/fuel ratio at step 516. In one example, the substitution ratio may be proportional to each of the intake manifold temperature and the engine load. Thus, the substitution ratio may increase in response to the intake manifold temperature increasing or being able to increase. Additionally or alternatively, the substitution ratio may increase in response to the engine load increasing. If an injection timing can be more advanced, then the substitution ratio may be increased. In one example, the injection timing refers to an injection timing of a carbon-containing fuel included in the substitution ratio. If the carbon-containing fuel is diesel, then advancing the injection timing may include injecting the diesel via a first injection and a second injection, wherein the first injection is a pilot injection and the second injection is a main injection. The earlier the pilot injection and/or the main injection are provided to a cylinder, then the higher the substitution rate may be increased. Additionally or alternatively, the substitution ratio may be increased in response to an increasing air/fuel ratio. In one example, the substitution ratio may increase in response to the air/fuel ratio increasing within a desired air/fuel ratio range, wherein an air/fuel ratio above the desired air/fuel ratio range may include too much air, reducing an ignitability of the ammonia. An air/fuel ratio below the desired range may inherently include too much carbon-containing fuel, thereby decreasing the substitution ratio.

In some examples, additionally or alternatively, ammonia may be heated prior to being provided to the cylinder. Heating the ammonia may increase an ignitability of the ammonia, which may increase the threshold substitution ratio. In one example, ammonia may be used as a coolant in the EGR cooler, wherein the ammonia may be directed to a fuel rail following flowing through the EGR cooler and thermally communicating with EGR.

At step 518, the method may include increasing an intake manifold temperature to a determined manifold temperature. In one example, the determined intake manifold temperature may be a dynamic value based one or more of a threshold intake manifold temperature, a compressor outlet temperature, a threshold pre-turbine temperature, and $NO_x$ emissions limits. In one example, the determined intake manifold temperature may be equal to a percentage of the threshold intake manifold temperature, wherein the threshold intake manifold temperature is based on a temperature of the intake manifold where a likelihood of thermal degradation increases. In one example, the determined intake manifold temperature is a manifold temperature between a current intake manifold temperature and the threshold intake manifold temperature. The determined intake manifold temperature is based on the threshold substitution ratio, wherein an increased intake manifold temperature may be desired when using the threshold substitution ratio. If the determined intake manifold temperature exceeds the threshold intake manifold temperature, then the determined intake manifold temperature may be reduced to a temperature less than the threshold intake manifold temperature. In this way, the threshold intake manifold temperature is avoided.

In one example, the determined intake manifold temperature is equal to a currently allowed intake manifold temperature for the present engine operating conditions and/or vehicle operating conditions. The currently allowed intake manifold temperature may be a dynamic value based a threshold intake manifold temperature, a compressor outlet temperature, a threshold pre-turbine temperature, and $NO_x$ emissions limits. In one example, the currently allowed intake manifold temperature may be equal to a percentage of the threshold intake manifold temperature, wherein the threshold intake manifold temperature is based on a temperature of the intake manifold where a likelihood of thermal degradation increases. In one example, the currently allowed intake manifold temperature may be a dynamic value based on a current operating parameters. The currently allowed intake manifold temperature is less than the threshold intake manifold temperature during all conditions.

The currently allowed intake manifold temperature may increase in response to a higher compressor outlet temperature, a difference between a current pre-turbine temperature and the threshold pre-turbine temperature increasing, and a difference between a current $NO_x$ output and a $NO_x$ emission limit increasing. Additionally or alternatively, the intake manifold temperature may increase in response to increasing a boost air flow rate, which may increase the compressor outlet temperature. As the intake manifold temperature increases, the compressor outlet temperature may increase, the current pre-turbine temperature may increase, and the current $NO_x$ output may increase. The intake manifold temperature may be increased via decreasing an engine speed, increasing a cooler outlet temperature, decreasing a fan speed, increasing an amount of hydrogen provided to the engine, bypassing a charge-air-cooler (CAC), and adjusting a valve and/or ignition timing. Increasing the cooler outlet temperature may include where less coolant is provided to cooler and/or where less EGR is directed through the cooler. Additionally or alternatively, the fan speed may be reduced to increase the intake manifold temperature. In one example, the fan speed corresponds to a radiator fan speed. In one example, hydrogen may increase an ignitability of a combustion mixture, which may increase the intake manifold temperature, and, additionally or alternatively, increase the substitution ratio. Adjusting the valve and/or ignition timing may include advancing an intake valve opening to overlap with an exhaust valve opening to flow hot exhaust gases through the intake valve and into the intake manifold. Additionally or alternatively, the ignition timing may be retarded and exhaust gas temperatures may increase to further increase the intake manifold temperature as EGR flows therethrough. Adjustments to each of the previously described parameters may vary based on current operating conditions, thereby adjusting the currently allowed intake manifold temperature across operating conditions.

Increasing the cooler outlet temperature may include flowing less coolant to the cooler and/or flowing less EGR through the cooler. Additionally or alternatively, the fan speed may be reduced to increase the intake manifold temperature. In one example, the fan speed corresponds to a radiator fan speed. In one example, hydrogen may increase an ignitability of a combustion mixture, which may increase the intake manifold temperature, and, additionally or alternatively, increase the substitution ratio. Adjusting the valve timing may include advancing an intake valve opening to overlap with an exhaust valve opening to flow hot exhaust gases through the intake valve and into the intake manifold. Additionally or alternatively, the ignition timing may be retarded and exhaust gas temperatures may increase to further increase the intake manifold temperature as EGR flows therethrough.

In some examples, additionally or alternatively, hydrogen may be used to increase an ignitability of the combustion mixture. In one example, an amount of diesel may be reduced and the amount of hydrogen may increase, which may decrease an overall air/fuel ratio. When hydrogen is included in the combustion mixture, the substitution ratio may increase above the threshold substitution ratio without increasing the intake manifold temperature. During some conditions, the intake manifold temperature may be reduced from the determined intake manifold temperature if a likelihood of knock increases. Similarly, the substitution ratio may decrease to the threshold substitution ratio while still including hydrogen.

At step 520, the method may include determining if the intake manifold temperature is equal to a determined intake manifold temperature. The determined intake manifold temperature may be equal to a temperature at which ammonia usage may be increased to high amounts relatively to other fuels, such as diesel and hydrogen. In one example, the determined intake manifold temperature may increase in response to EGR cooling not being desired, exhaust valve cooling not being desired, and an ammonia temperature being lower. The determined intake manifold temperature may decrease in response to EGR cooling being desired, exhaust valve cooling being desired, and an ammonia temperature being higher. Thus, when ammonia is heated via a source other than the intake manifold, the determined intake manifold temperature may be reduced while still achieving a relatively high amount of ammonia in the substitution ratio.

At step 522, the method may include increasing the amount of hydrogen in the substitution ratio. The amount of hydrogen may be increased due to the intake manifold temperature being less than the determined intake manifold temperature, resulting in conditions being too cool for a high ratio of ammonia. By including hydrogen, an ignitability of the combustion mixture may be enhanced despite the intake manifold temperature being less than the determined intake manifold temperature.

At step 524, the method may include adjusting an injection timing. The injection timing may correspond to an ammonia injection timing, hydrogen injection timing, and/or a diesel injection timing. In one example, the ammonia injection timing may be more advanced to promote further mixing of the ammonia with boost air and EGR. The diesel injection timing may include advancing a pilot injection timing. Additionally or alternatively, an amount of diesel included in the pilot injection timing may be adjusted. For example, the amount of diesel in the pilot injection timing may be increased and the amount of diesel in a main injection may be decreased, which may increase an overall ignitability of the ammonia due to a greater amount of mixing between the ammonia and diesel.

An injection location may also be adjusted. For example, a greater amount of ammonia may be injected toward one or more of the EGR passage or the exhaust valve. Additionally or alternatively, ammonia injected into the intake manifold may be ammonia used as a coolant so that the ammonia is at least partly heated via a source other than the intake manifold.

At step 526, the method may include continuing to adjust the substitution ratio based on the intake manifold temperature. For example, if the intake manifold temperature increases, then the amount of hydrogen may be reduced and the amount of ammonia may increase. Additionally or alternatively, if the intake manifold temperature decreases, the amount of hydrogen may increase and the amount of ammonia may decrease.

Returning to step 520, if the intake manifold temperature is substantially equal to the determined temperature, then at step 528, the method may include increasing the amount of ammonia included in the substitution ratio. In one example, a ratio of ammonia to hydrogen in the combustion mixture may be relatively high. In one example, hydrogen may be excluded from the combustion mixture when the intake manifold temperature is equal to the determined intake manifold temperature.

At step 530, the method may include adjusting the injection timing similar to step 524 described above. Furthermore, a location at which the ammonia is provided may be adjusted. In one example, more ammonia may be injected into the intake manifold relative to the EGR passage or toward the exhaust valve.

At step 532, the method may include maintaining an intake manifold temperature at the determined intake manifold temperature via adjusting the fan and the cooler outlet temperature. For example, if the intake manifold temperature is approaching the threshold intake manifold temperature, then a fan speed may be increased to decrease the intake manifold temperature. Additionally or alternatively, the cooler outlet temperature may be reduced by flowing more coolant to the cooler and/or flowing less or cooler EGR therethrough. As another example, if the intake manifold temperature is falling below the determined intake manifold temperature, then the fan speed may be reduced and the cooler outlet temperature may be increased. By doing this, ammonia may be desirably heated prior to reaching the cylinder, which may enhance its ignitability and improve combustion conditions.

In some examples, if the intake manifold temperature exceeds the threshold intake manifold temperature, then operating parameters may be adjusted. In one example, injection timing may be adjusted to a less optimal timing to decrease combustion temperatures and thereby decrease the intake manifold temperature. In one example, the less optimal timing may include retarding the injection timing. As another example, the EGR flow rate may be reduced and/or the amount of boost may be reduced. If the intake manifold temperature still exceeds the threshold intake manifold temperature, then an engine power output may be reduced.

Turning now to FIG. 6, it shows a plot 600 illustrating adjustments to a substitution ratio in response to an intake manifold temperature. Plot 610 illustrates a substitution ratio. Plot 620 illustrates an amount of hydrogen included in the substitution ratio. Plot 630 illustrates an amount of ammonia including the substitution ratio. Plot 640 illustrates an intake manifold temperature and dashed line 642 illustrates a determined intake manifold temperature. The substitution ratio may be adjusted by adjusting the amount of hydrogen and/or the amount of ammonia. Additionally or alternatively, the substitution ratio may be held relatively constant while adjusting the amount of hydrogen and the amount of ammonia relative to one another. In one embodiment, the ratio of hydrogen/ammonia within the substitution ratio is adjusted in response to the intake manifold temperature. Time increases along the abscissa and values of the various plots increase along the ordinate.

Prior to t1, the intake manifold temperature is relatively low and less than a determined intake manifold temperature. In one example, the determine intake manifold temperature is based on a temperature at which the substitution ratio may include a relatively high amount of ammonia. The amount of hydrogen is relatively high and the amount of ammonia is relatively low due to the low intake manifold temperature. Hydrogen may be desired when the intake manifold temperature due to hydrogen being more ignitable than ammonia. At t1, the intake manifold temperature begins to increase toward the determined intake manifold temperature.

Between t1 and t2, as the intake manifold temperature increases toward the determined intake manifold temperature, the amounts of ammonia and hydrogen are adjusted while maintaining the substitution ratio relatively constant. In one example, the substitution ratio is maintained at the threshold substitution ratio independent of the intake manifold temperature. The amount of ammonia increases as the intake manifold temperature increases. Furthermore, the amount of hydrogen decreases as the intake manifold temperature increases, wherein a magnitude in which the amount of hydrogen decreases is proportional to a magnitude in which the amount of ammonia increases.

At t2, the intake manifold temperature is equal to the determined intake manifold temperature. Between t2 and t3, the amount of ammonia is equal to a relatively high amount and the amount of hydrogen is equal to a relatively low amount. In one example, the amount of hydrogen is zero.

At t3, the intake manifold temperature begins to decrease. After t3, the amount of ammonia decreases and the amount of hydrogen increases. Thus, the substitution ratio may be maintained as the intake manifold temperature. In some examples, the intake manifold temperature may be actively increased to promote an increased amount of ammonia consumption. However, during operating conditions where passive control of the intake manifold temperature is realized, the substitution ratio may be maintained by adjusting the ratio of hydrogen relative to ammonia in proportion to the intake manifold temperature.

The technical effect of adjusting the ratio of hydrogen to ammonia based on the intake manifold temperature is to maintain a threshold substitution ratio. By doing this, a consumption of carbon-containing fuels may be reduced as the intake manifold temperature changes in response to operating parameters.

The disclosure provides support for a method including increasing an intake manifold temperature and increasing a substitution ratio of a mixture of plural fuels, at least one of the fuels comprising ammonia, in cooperation with the increase in intake manifold temperature. A first example of the method further includes increasing the intake manifold temperature comprises decreasing an engine speed. A second example of the method, optionally including the first example, further includes where the mixture further comprises one or more of gasoline, diesel, biodiesel, hydrogenation-derived renewable diesel (HDRD), alcohol(s), ethers, hydrogen, natural gas, kerosene, and syn-gas. A third example of the method, optionally including one or more of the previous examples, further includes determining an intake manifold temperature, and the determined intake manifold temperature is based on one or more current engine operating parameters and a threshold intake manifold temperature, wherein the intake manifold temperature is increased to the determined intake manifold temperature. A fourth example of the method, optionally including one or more of the previous examples, further includes where the one or more current engine operating parameters comprises at least one of a compressor outlet temperature, a threshold pre-turbine temperature, and $NO_x$ emissions limits. A fifth example of the method, optionally including one or more of the previous examples, further includes determining a substitution ratio based at least in part on the intake manifold temperature. A sixth example of the method, optionally including one or more of the previous examples, further includes where controlling or maintaining the intake manifold temperature at or below a threshold intake manifold temperature via one or more of a radiator fan, a coolant bypass controller, a coolant flow controller, radiator shutters and a cooler.

The disclosure further provides support for a system including a first fuel system containing a first fuel, a second fuel system containing a second fuel different than the first fuel, and a controller comprising computer-readable instructions stored on non-transitory memory thereof that when executed enable the controller to adjust a substitution ratio of the first fuel relative to the second fuel based at least in part on a determined intake manifold temperature. A first example of the system further includes where the controller is configured to adjust the substitution ratio based at least in part on an engine load or an injection timing. A second example of the system, optionally including the first example, further includes where the determined intake manifold temperature is based at least in part on current engine operating parameters and a threshold intake manifold temperature, and the determined intake manifold temperature is less than or equal to the threshold intake manifold temperature. A third example of the system, optionally including one or more of the previous examples, further includes where the instructions further enable the controller to cause one or more of to decrease an engine speed, increase a boost air flow rate, adjust an injection timing, adjust a valve timing, adjust an ignition timing, increase an exhaust gas temperature, and increase a cooler outlet temperature in response to a current intake manifold temperature being less than the determined intake manifold temperature. A fourth example of the system, optionally including one or more of the previous examples, further includes where the instructions further enable the controller to maintain an intake manifold temperature at the determined intake manifold temperature via a radiator fan and a cooler, and the cooler is an EGR cooler. A fifth example of the system, optionally including one or more of the previous examples, further includes where the controller is configured to adjust the substitution ratio based at least in part on an air/fuel ratio, or is configured to adjust the air/fuel ratio based at least in part on the substitution ratio. A sixth example of the system, optionally including one or more of the previous examples, further includes where the first fuel system is coupled to a direct injector positioned to inject directly into a volume of a cylinder of an engine, and wherein the second fuel system is coupled to a port-injector positioned to inject into an intake port of the cylinder. A seventh example of the system, optionally including one or more of the previous examples, further includes where the first fuel is diesel and the second fuel is ammonia.

The disclosure further provides support for a method including adjusting a substitution ratio of a mixture of fuels comprising ammonia based at least in part on an intake manifold temperature. A first example of the method further includes increasing an amount of ammonia and decreasing an amount of other fuels included in the substitution ratio in response to an increase in the intake manifold temperature. A second example of the method, optionally including the first example, further includes decreasing an amount of ammonia and increase an amount of other fuels included in the substitution ratio in response to a decrease in the intake manifold temperature, wherein the other fuels are more ignitable than ammonia. A third example of the method, optionally including one or more of the previous examples, further includes where the substitution ratio comprises at least ammonia and hydrogen. A fourth example of the method, optionally including one or more of the previous examples, further includes where actively increasing the intake manifold temperature via one or more of decreasing an engine speed, increasing a boost air flow rate, adjusting an injection timing, adjusting a valve timing, adjusting an ignition timing, increasing an exhaust gas temperature, and increasing a cooler outlet temperature in response to the intake manifold temperature being less than a determined intake manifold temperature.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    increasing an intake manifold temperature via decreasing an engine speed; and
    increasing a substitution ratio of a mixture of plural fuels, at least one of the fuels comprising ammonia, in cooperation with the increase in intake manifold temperature.

2. The method of claim 1, wherein increasing the intake manifold temperature further comprises one or more of increasing a cooler outlet temperature, decreasing a fan speed, increasing an amount of hydrogen provided to an engine, bypassing a charge-air-cooler (CAC), adjusting a valve timing, and adjusting an ignition timing.

3. The method of claim 1, wherein the mixture further comprises one or more of gasoline, diesel, biodiesel, hydrogenation-derived renewable diesel (HDRD), alcohol(s), ethers, hydrogen, natural gas, kerosene, and syn-gas.

4. The method of claim 1, further comprising determining the intake manifold temperature, and the determined intake manifold temperature is based on one or more current engine operating parameters and a threshold intake manifold temperature, wherein the intake manifold temperature is increased to the determined intake manifold temperature.

5. The method of claim 4, wherein the one or more current engine operating parameters comprises at least one of a compressor outlet temperature, a threshold pre-turbine temperature, and $NO_x$ emissions limits, and wherein the threshold intake manifold temperature is greater than the determined intake manifold temperature.

6. The method of claim 1, further comprising determining the substitution ratio based at least in part on one or more of the intake manifold temperature, an engine load, an engine temperature, an injection timing, and an air/fuel ratio.

7. The method of claim 1, further comprising controlling or maintaining the intake manifold temperature at or below a threshold intake manifold temperature via one or more of a radiator fan, a coolant bypass controller, a coolant flow controller, radiator shutters and a cooler.

8. A system, comprising:
a first fuel system containing a first fuel;
a second fuel system containing a second fuel different than the first fuel;
an engine coupled to the first fuel system and the second fuel system; and
a controller comprising computer-readable instructions stored on non-transitory memory thereof that when executed enable the controller to:
actively adjust a current intake manifold temperature to a determined intake manifold temperature via increasing an amount of hydrogen provided to the engine; and
adjust a substitution ratio of the first fuel relative to the second fuel based at least in part on the current intake manifold temperature.

9. The system of claim 8, wherein the controller is further configured to adjust the substitution ratio based at least in part on an engine load or an injection timing.

10. The system of claim 8, wherein the determined intake manifold temperature is based at least in part on current engine operating parameters and a threshold intake manifold temperature, and the determined intake manifold temperature is less than or equal to the threshold intake manifold temperature, and wherein the instruction further enable the controller to decrease the amount of hydrogen provided to the engine in response to the current intake manifold temperature being equal to the determined intake manifold temperature.

11. The system of claim 8, wherein the instructions further enable the controller to cause one or more of a decrease in an engine speed, an increase in a boost air flow rate, a retard in an injection timing, an advance in a valve timing an increase in an exhaust gas temperature, and an increase in a cooler outlet temperature in response to the current intake manifold temperature being less than the determined intake manifold temperature.

12. The system of claim 8, wherein the instructions further enable the controller to maintain an intake manifold temperature at the determined intake manifold temperature via a radiator fan and a cooler, and the cooler is an EGR cooler, further comprising a third fuel system comprising hydrogen, wherein the instructions further enable the controller to adjust the substitution ratio of the first fuel relative to one or more of the second fuel and hydrogen based on the current intake manifold temperature.

13. The system of claim 8, wherein the controller is configured to adjust the substitution ratio based at least in part on an air/fuel ratio, or is configured to adjust the air/fuel ratio based at least in part on the substitution ratio.

14. The system of claim 8, wherein the first fuel system is coupled to a direct injector positioned to inject directly into a volume of a cylinder of the engine, and wherein the second fuel system is coupled to a port-injector positioned to inject into an intake port of the cylinder.

15. The system of claim 8, wherein the first fuel is diesel and the second fuel is ammonia.

16. A method, comprising:
increasing a substitution ratio of a mixture of fuels comprising ammonia via actively increasing an intake manifold temperature to a determined intake manifold temperature via decreasing an engine speed.

17. The method of claim 16, further comprising increasing an amount of ammonia and decreasing an amount of other fuels included in the substitution ratio in response to increasing the intake manifold temperature.

18. The method of claim 17, further comprising decreasing an amount of ammonia and increasing an amount of other fuels included in the substitution ratio in response to a decrease in the intake manifold temperature, wherein the other fuels are more ignitable than ammonia and comprise hydrogen.

19. The method of claim 18, wherein the substitution ratio comprises at least ammonia and hydrogen, and wherein an amount of hydrogen included in the substitution ratio increases and the amount of ammonia decreases when the intake manifold temperature is less than the determined intake manifold temperature.

20. The method of claim 16, further comprising actively increasing the intake manifold temperature via one or more of increasing a boost air flow rate, adjusting an injection timing, adjusting a valve timing, increasing an exhaust gas temperature, and increasing a cooler outlet temperature in response to the intake manifold temperature being less than the determined intake manifold temperature.

* * * * *